US012094424B2

(12) United States Patent
Kim et al.

(10) Patent No.: US 12,094,424 B2
(45) Date of Patent: Sep. 17, 2024

(54) DISPLAY DEVICE AND DATA DRIVING CIRCUIT

(71) Applicant: LG DISPLAY CO., LTD., Seoul (KR)

(72) Inventors: Hong Soon Kim, Paju-si (KR); Chan Park, Paju-si (KR); Nakyoon Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/974,320

(22) Filed: Oct. 26, 2022

(65) Prior Publication Data

US 2023/0143178 A1 May 11, 2023

(30) Foreign Application Priority Data

Nov. 10, 2021 (KR) ........................ 10-2021-0153781

(51) Int. Cl.

*G09G 3/3291* (2016.01)
*G09G 3/20* (2006.01)
*G09G 3/3233* (2016.01)

(52) U.S. Cl.

CPC ......... *G09G 3/3291* (2013.01); *G09G 3/2074* (2013.01); *G09G 3/3233* (2013.01); *G09G 2300/0819* (2013.01); *G09G 2300/0842* (2013.01); *G09G 2310/0291* (2013.01); *G09G 2310/0297* (2013.01); *G09G 2330/021* (2013.01)

(58) Field of Classification Search

CPC .. G09G 3/3291; G09G 3/2074; G09G 3/3233; G09G 2300/0819; G09G 2300/0842; G09G 2310/0291; G09G 2310/0297; G09G 2330/021

See application file for complete search history.

(56) References Cited

U.S. PATENT DOCUMENTS 10,163,397 B2 12/2018 Son et al.
10,467,951 B2 11/2019 Bae et al.
(Continued)

FOREIGN PATENT DOCUMENTS

CN 102290032 A 12/2011
CN 106328077 A 1/2017
(Continued)

OTHER PUBLICATIONS

Office Action issued on May 6, 2024 for Chinese Patent Application No. 202211304858.8 (partial English translation included).

*Primary Examiner* — Kenneth B Lee, Jr.

(74) *Attorney, Agent, or Firm* — Morgan, Lewis & Bockius LLP

(57) ABSTRACT

Embodiments of the disclosure relate to a display device and a data driving circuit. Specifically, there may be provided a display device with enhanced power efficiency and a data driving circuit by providing a display device including a display panel divided into an always-on display area displaying information during a standby screen period and a black grayscale area except for the always-on display area, an image display voltage output circuit outputting a data voltage to input to the always-on display area during the standby screen period, and a voltage stabilization circuit outputting a constant voltage to input to at least a partial area of the black grayscale area during the standby screen period.

19 Claims, 10 Drawing Sheets

<Anode Reset Frame>

(56) References Cited

U.S. PATENT DOCUMENTS

| | | | | |
|---|---|---|---|---|
| 10,643,565 | B2 | 5/2020 | Park et al. | |
| 11,250,762 | B2 | 2/2022 | Nam et al. | |
| 2011/0310135 | A1 | 12/2011 | Feng | |
| 2016/0049106 | A1 | 2/2016 | Connell et al. | |
| 2017/0330518 | A1* | 11/2017 | Lee | G09G 3/3233 |
| 2018/0204303 | A1 | 7/2018 | Bae et al. | |
| 2020/0294451 | A1* | 9/2020 | Kim | G09G 3/3291 |
| 2020/0394962 | A1* | 12/2020 | Seo | G09G 3/3275 |
| 2021/0201798 | A1 | 7/2021 | Kim et al. | |
| 2021/0319770 | A1 | 10/2021 | Park et al. | |
| 2022/0270552 | A1* | 8/2022 | Roh | G09G 3/3266 |
| 2022/0300665 | A1* | 9/2022 | Xu | G06F 3/147 |

FOREIGN PATENT DOCUMENTS

| | | | |
|---|---|---|---|
| CN | 107437403 | A | 12/2017 |
| CN | 107452328 | A | 12/2017 |
| CN | 107851415 | A | 3/2018 |
| CN | 109493793 | A | 3/2019 |
| CN | 109643516 | A | 4/2019 |
| CN | 113362778 | A | 9/2021 |
| CN | 113539180 | A | 10/2021 |

* cited by examiner

<Sampling Period>

DISPLAY DEVICE AND DATA DRIVING CIRCUIT

CROSS-REFERENCE TO RELATED APPLICATION

Among This application claims priority from Korean Patent Application No. 10-2021-0153781, filed on Nov. 10, 2021, which is hereby incorporated by reference for all purposes as if fully set forth herein.

BACKGROUND

Technical Field

Embodiments of the disclosure relate to a display device and a data driving circuit.

Description of the Related Art

As the information society develops, various demands for display devices for displaying images are increasing, and as liquid crystal various types of display devices, such displays (LCDs) and organic light emitting diode (OLED) displays, are used.

Among these display devices, the organic light emitting displays adopt organic light emitting diodes (OLEDs) and thus has fast responsiveness and various merits in contrast ratio, luminous efficiency, brightness, and viewing angle.

The organic light emitting display device may include organic light emitting diodes (OLED) each disposed in each of a plurality of subpixels disposed on the display panel and allows the organic light emitting diodes (OLEDs) to emit light by controlling the current flowing through the organic light emitting diodes (OLEDs), thereby displaying an image while controlling the brightness of each subpixel.

The image data supplied to the display device may be a still image or a video that is variable at a constant speed, such as a sports video, movie, or game video.

Such a display device may be capable of both high-speed driving and low-speed driving to increase power efficiency while displaying various types of images.

Such a display device may perform an always-on display (AoD) function that provides information to the user by displaying an important notification on the screen during a standby screen period when the display device is not in an active state.

SUMMARY

Accordingly, embodiments of the present disclosure are directed to a display device and a data driving circuit that substantially obviate one or more of the problems due to limitations and disadvantages of the related art.

An aspect of the present disclosure is to provide a display device and a data driving circuit with enhanced power consumption efficiency during a standby screen period.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel divided into an always-on display area displaying information during a standby screen period and a black grayscale area except for the always-on display area, an image display voltage output circuit outputting a data voltage to input to the always-on display area during the standby screen period, and a voltage stabilization circuit outputting a constant voltage to input to at least a partial area of the black grayscale area during the standby screen period.

In another aspect, a data driving circuit comprises an image display voltage output circuit outputting a data voltage for displaying information during a standby screen period, a voltage stabilization circuit configured to output a preset level of data voltage during the standby screen period, and a multiplexer configured to output any one of a voltage input from the image display voltage output circuit and a voltage input from the voltage stabilization circuit.

According to embodiments of the disclosure, there may be provided a display device and a data driving circuit with enhanced power consumption efficiency during a standby screen period.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
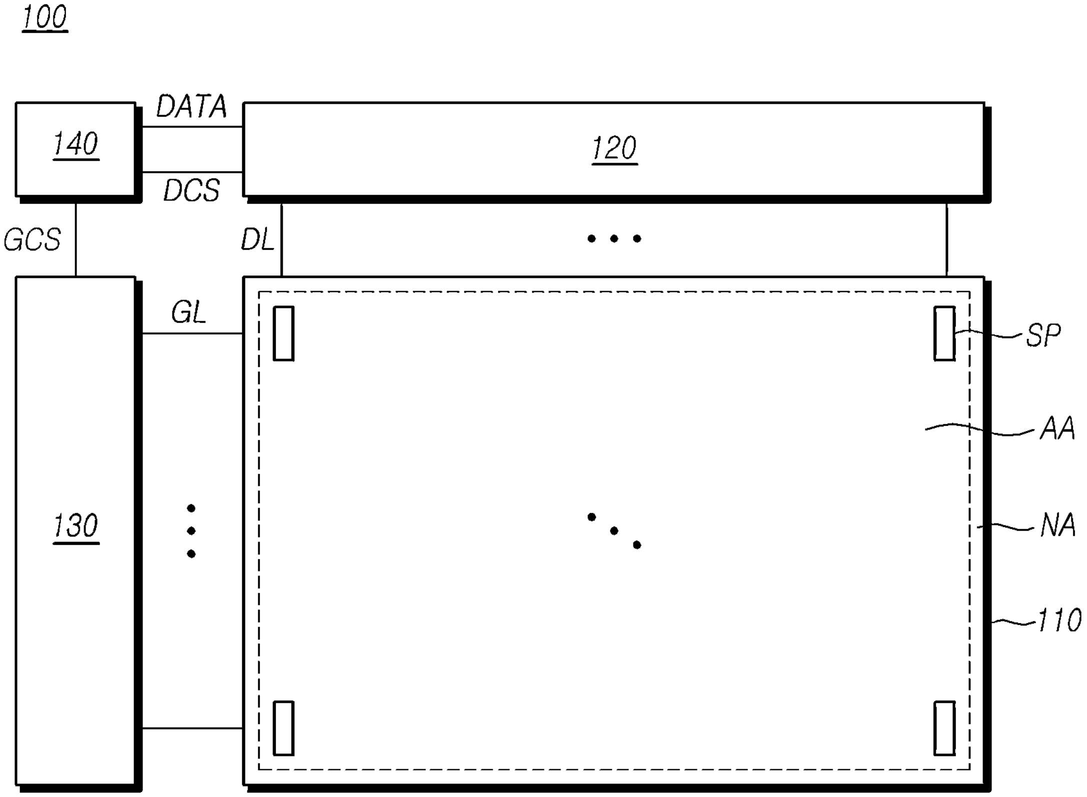
FIG. 1 is a view schematically illustrating a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", and "constituting" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

FIG. 1 is a view schematically illustrating a display device 100 according to embodiments of the disclosure.

Referring to FIG. 1, a display device 100 according to the disclosure may include a display panel 110, a data driving circuit 120 and a gate driving circuit 130 for driving the display panel 110, and a controller 140 configured to control the data driving circuit 120 and the gate driving circuit 130.

In the display panel 110, signal lines, such as a plurality of data lines DL and a plurality of gate lines GL, may be disposed on a substrate. In the display panel 110, a plurality of subpixels SP electrically connected with the plurality of data lines DL and the gate lines GL may be disposed.

The display panel 110 may include a display area AA in which images are displayed and a non-display area NA in which no image is displayed. In the display panel 110, a plurality of subpixels SP for displaying an image may be disposed in the display area AA and, in the non-display area NA, the data driving circuit 120 and the gate driving circuit 130 may be mounted, or pad units connected with the data driving circuit 120 or the gate driving circuit 130 may be disposed.

The data driving circuit 120 is a circuit configured to drive the plurality of data lines DL, and may supply data voltages to the plurality of data lines DL. The gate driving circuit 130 is a circuit configured to drive the plurality of gate lines GL, and may supply gate signals to the plurality of gate lines GL. The controller 140 may supply a data driving timing control signal DCS to the data driving circuit 120 to control the operation timing of the data driving circuit 120. The controller 140 may supply a gate driving timing control signal GCS for controlling the operation timing of the gate driving circuit 130 to the gate driving circuit 130.

The controller 140 may start scanning according to a timing implemented in each frame, convert input image data input from the outside into image data DATA suited for the data signal format used in the data driving circuit 120, supply the image data DATA to the data driving circuit 120, and control data driving at an appropriate time suited for scanning.

The controller 140 receives, from the outside (e.g., a host system), various timing signals including a vertical synchronization signal Vsync, a horizontal synchronization signal Hsync, an input data enable signal DE, and a clock signal, along with the input image data.

To control the data driving circuit 120 and the gate driving circuit 130, the controller 140 receives timing signals, such as the vertical synchronization signal Vsync, horizontal synchronization signal Hsync, input data enable signal DE, and clock signal CLK, generates various control signals DCS and GCS, and outputs the control signals to the data driving circuit 120 and the gate driving circuit 130.

To control the gate driving circuit 130, the controller 140 outputs various gate driving timing control signals GCS including a gate start pulse GSP, a gate shift clock GSC, and a gate output enable signal GOE.

To control the data driving circuit 120, the controller 140 outputs various data driving timing control signals DCS including, e.g., a source start pulse SSP and a source sampling clock.

The data driving circuit 120 receives the image data DATA from the controller 140 and drives the plurality of data lines DL.

The data driving circuit 120 may include one or more source driver integrated circuit SDIC.

Each source driver integrated circuit SDIC may be connected with the display panel 110 by a tape automated bonding (TAB) method or connected to a bonding pad of the display panel 110 by a chip on glass (COG) method or may be implemented by a chip on film (COF) method and connected with the display panel 110.

The gate driving circuit 130 may output a gate signal of a turn-on level voltage or a gate signal of a turn-off level voltage according to the control of the controller 140. The gate driving circuit 130 may drive the plurality of gate lines GL by supplying gate signals of the turn-on level voltage to the plurality of gate lines GL.

The gate driving circuit 130 may be connected with the display panel 110 by a tape automated bonding (TAB) method or connected to a bonding pad of the self-emission display panel 110 by a COG or chip on panel (COP) method or may be connected with the display panel 110 according to a COF method.

The gate driving circuit 130 may be formed in a gate in panel (GIP) type, in the non-display area NA of the display panel 110. The gate driving circuit 130 may be disposed on the substrate of the display panel 110 or may be connected to the substrate of the display panel 110. The gate driving circuit 130 that is of a GIP type may be disposed in the non-display area NA of the substrate. The gate driving circuit 130 that is of a chip-on-glass (COG) type or chip-on-film (COF) type may be connected to the substrate of the display panel 110.

When a specific gate line GL is opened by the gate driving circuit 130, the data driving circuit 120 may convert the image data DATA received from the controller 140 into an analog data voltage and supply it to the plurality of data lines DL.

The data driving circuit 120 may be connected with one side (e.g., an upper or lower side) of the display panel 110. Depending on the driving scheme or the panel design scheme, the data driving circuit 120 may be connected with both sides (e.g., upper and lower sides) of the self-emission display panel 110, or two or more of the four sides of the self-emission display panel 110.

The gate driving circuit 130 may be connected with one side (e.g., a left or right side) of the display panel 110. Depending on the driving scheme or the panel design scheme, the gate driving circuit 130 may be connected with both sides (e.g., left and right sides) of the display panel 110, or two or more of the four sides of the display panel 110.

The controller 140 may be a timing controller used in typical display technology, a control device that may perform other control functions as well as the functions of the timing controller, or a control device other than the timing controller, or may be a circuit in the control device. The controller 140 may be implemented as various circuits or electronic components, such as an integrated circuit (IC), a field programmable gate array (FPGA), an application specific integrated circuit (ASIC), or a processor.

The controller 140 may be mounted on a printed circuit board or a flexible printed circuit and may be electrically connected with the data driving circuit 120 and the gate driving circuit 130 through the printed circuit board or the flexible printed circuit.

The controller 140 may transmit/receive signals to/from the data driving circuit 120 according to one or more predetermined interfaces. The interface may include, e.g., a low voltage differential signaling (LVDS) interface, an EPI interface, and a serial peripheral interface (SPI).

The controller 140 may include a storage medium, such as one or more registers.

The display device 100 according to embodiments of the disclosure may be a display including a backlight unit, such as a liquid crystal display, or may be a self-emission display, such as an organic light emitting diode (OLED) display, a quantum dot display, or a micro light emitting diode (LED) display.

When the display device 100 according to embodiments of the disclosure is an OLED display, each subpixel SP may include an organic light emitting diode (OLED), which is self-luminous, as a light emitting element. When the display device 100 according to embodiments of the disclosure is a quantum dot display, each subpixel SP may include a light emitting element formed of a quantum dot, which is a self-luminous semiconductor crystal. When the display device 100 according to embodiments of the disclosure is a micro LED display, each subpixel SP may include a micro light emitting diode, which is self-luminous and formed of an inorganic material, as a light emitting element. For convenience of description, an example in which the display device 100 according to embodiments of the disclosure is an OLED display is described below, but embodiments of the disclosure are not limited thereto.

Figure 2:
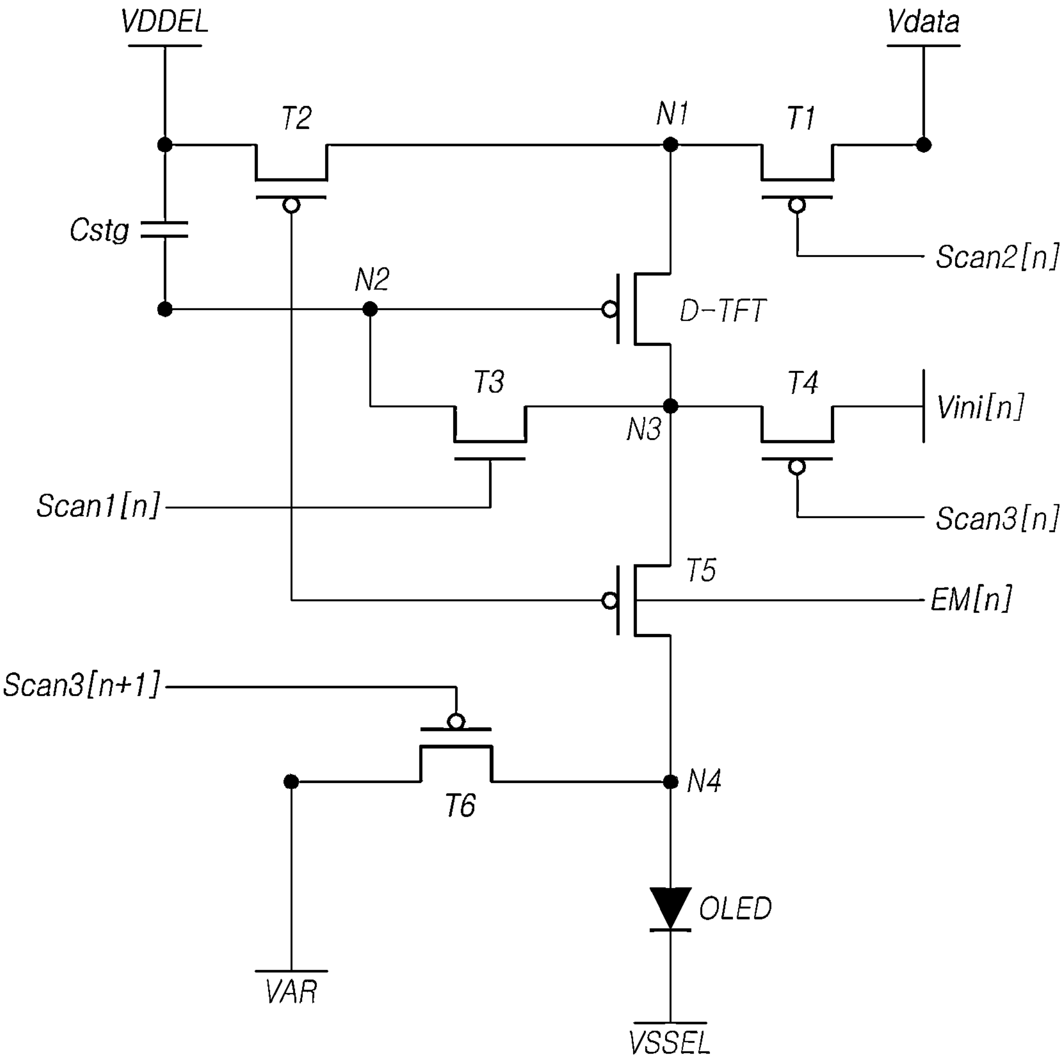
FIG. 2 is a view illustrating an example of a subpixel of a display device according to embodiments of the disclosure.

FIG. 2 is a view illustrating an example of a subpixel SP of a display device 100 according to embodiments of the disclosure.

Referring to FIG. 2, a subpixel SP may include an organic light emitting element OLED and a driving transistor D-TFT configured to drive the organic light emitting element OLED.

The subpixel SP may further include one or more transistors in addition to the driving transistor D-TFT. Each subpixel SP may include one or more oxide semiconductor transistors (Oxide TFTs).

The subpixel SP may include the driving transistor D-TFT and first to sixth transistors T1 to T6. Each of the transistors may be a P-type transistor or an N-type transistor.

The N-type transistor may be formed of an oxide transistor formed of a semiconducting oxide (e.g., a transistor having a channel formed from a semiconducting oxide, such as indium, gallium, zinc oxide, or IGZO). The P-type transistor may be a silicon transistor formed of a semiconductor, such as silicon (e.g., a transistor having a polysilicon channel formed by a low-temperature process referred to as LTPS or low-temperature polysilicon).

The oxide transistor has relatively lower leakage current than the silicon transistor.

The subpixel SP may further include a storage capacitor Cstg configured to apply a voltage corresponding to the data voltage Vdata to the gate node of the driving transistor D-TFT during one frame period.

The structure of the subpixel SP including seven transistors and one capacitor is also referred to as a 7T1C structure.

For convenience of description, an example in which the subpixel SP in the display device 100 according to embodiments of the disclosure has a 7T1C structure is described below. However, the structure of the subpixel SP in the display device 100 according to embodiments of the disclosure is not limited to the 7T1C structure, and the subpixel SP may further include one or more circuit elements.

The first transistor T1 may be configured to switch an electrical connection between the first node N1 of the driving transistor D-TFT and the data line DL. The first node N1 of the driving transistor D-TFT may be any one of the source node and drain node of the driving transistor D-TFT. The operation timing of the first transistor T1 may be controlled by the second scan signal Scan2. If the second scan signal Scan2 of the turn-on level voltage is applied to the first transistor T1, the data applied to the first node N1 of the driving voltage Vdata is transistor D-TFT.

The second transistor T2 may be configured to switch an electrical connection between the first node N1 of the driving transistor D-TFT and the high-potential driving voltage line VDDEL. The operation timing of the second transistor T2 may be controlled by the light emission signal EM. If the light emission signal EM of the turn-on level voltage is applied to the second transistor T2, the high-potential driving voltage VDDEL is applied to the first node N1 of the driving transistor D-TFT.

The storage capacitor Cstg may include one end electrically connected to the second node N2 of the driving transistor D-TFT and the other end electrically connected to the high-potential driving voltage VDDEL line. The second node N2 of the driving transistor D-TFT may be the gate node of the driving transistor D-TFT.

The third transistor T3 is electrically connected between the second node N2 and the third node N3 of the driving transistor D-TFT. The operation timing of the third transistor T3 may be controlled by the first scan signal Scan1. The third node N3 of the driving transistor D-TFT may be the other one of the source node and the drain node of the driving transistor D-TFT.

The third transistor T3 may be an oxide transistor. Since the oxide transistor has a low leakage current, the voltage level of the second node N2 of the driving transistor D-TFT may remain constant. Accordingly, even when the data voltage Vdata for image display is not applied every frame, the subpixel SP may display an image on the screen based on the data voltage Vdata for image display input in the previous frame. This is called low speed driving.

The fourth transistor T4 may be configured to switch an electrical connection between the third node N3 of the driving transistor D-TFT and the initialization voltage Vini line. The fourth transistor T4 may be controlled by the third scan signal Scan3. If the third scan signal Scan3 of the turn-on level voltage is applied, the initialization voltage Vini is applied to the third node N3 of the driving transistor D-TFT.

The fifth transistor T5 may be configured to switch an electrical connection between the third node N3 of the driving transistor D-TFT and the first electrode of the organic light emitting element OLED. The fifth transistor T5 may include a fourth node N4 and is electrically connected to the first electrode of the organic light emitting element OLED through the fourth node N4 of the fifth transistor T5. The fourth node N4 of the fifth transistor T5 may be the source node or the drain node of the fifth transistor T5. The first electrode of the organic light emitting element OLED may be an anode electrode or a cathode electrode. In the following description, it is assumed that the first electrode of the organic light emitting element OLED is an anode electrode.

The operation timing of the fifth transistor T5 is controlled by the light emission signal EM. The light emission signal EM for controlling the operation timing of the fifth transistor T5 may be the same as the light emission signal EM for controlling the operation timing of the second transistor T2. The gate node of the fifth transistor T5 and the gate node of the second transistor T2 may be electrically connected to one light emission signal EM line.

The sixth transistor T6 may be configured to switch an electrical connection between the first electrode of the organic light emitting element OLED and the reset voltage VAR line. When the first electrode of the organic light emitting element OLED is an anode electrode, the reset voltage VAR may be an anode reset voltage VAR.

The operation timing of the sixth transistor T6 may be controlled by the third scan signal Scan3. The third scan signal Scan3 for controlling the operation timing of the sixth transistor T6 is the same as the third scan signal Scan3 for controlling the operation timing of the fourth transistor T4 of another subpixel SP.

For example, the third scan signal Scan3 may be applied to the sixth transistor T6 included in the subpixel SP electrically connected to the n+1th gate line (where n is an integer larger than or equal to 1). The third scan signal Scan3 applied to the subpixel SP may be the same signal as the third scan signal Scan3 applied to the fourth transistor T4 included in the subpixel SP positioned on the nth gate line.

The first electrode of the organic light emitting element OLED is electrically connected to the fourth node N4 of the fifth transistor T5. The second electrode of the organic light emitting element OLED is electrically connected to the low-potential driving voltage VSSEL line. The first electrode of the organic light emitting element OLED may be an anode electrode or a cathode electrode. The second electrode of the organic light emitting element OELD may be a cathode electrode or an anode electrode.

The high-potential driving voltage VDDEL line and the low-potential driving voltage VSSEL line may be common voltage lines commonly connected to the plurality of subpixels SP disposed on the display panel 110.

Referring to FIG. 2, the third transistor T3 may be an N-type transistor. The remaining transistors may be P-type transistors. The driving transistor D-TFT, the first transistor T1, the second transistor T2, the fourth transistor T4, the fifth transistor T5, and the sixth transistor T6 may be P-type transistors, or one or more of the above-described transistors may be formed of N-type transistors.

Figure 3:
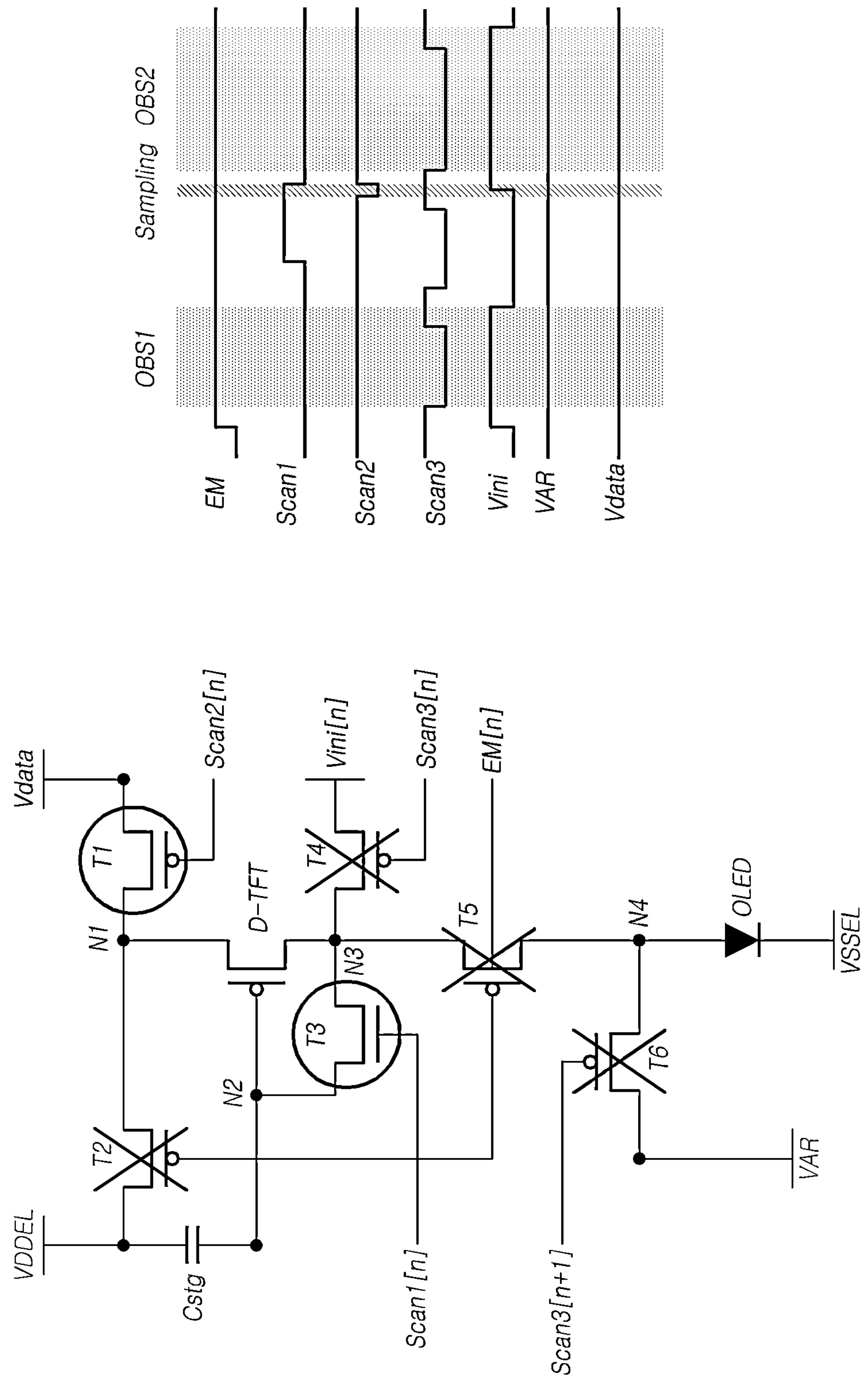
FIG. 3 is a view illustrating a sampling period in a display device according to embodiments of the disclosure.

FIG. 3 is a view illustrating a sampling period Sampling in a display device according to embodiments of the disclosure.

FIG. 3 is a timing diagram of a refresh frame period when a data voltage Vdata for image display is input to the subpixel SP in the 7T1C structure.

The refresh frame may include a first on-bias period OBS1 and a second on-bias period OBS2 configured to apply the initialization voltage Vini_H of a high-level voltage to the third node N3 of the driving transistor DRT and a sampling period Sampling configured to apply a voltage corresponding to the data voltage Vdata to the second node N2 of the driving transistor D-TFT.

The on-bias periods OBS1 and OBS2 may be periods for alleviating a hysteresis effect that may occur in the driving transistor D-TFT and enhancing response characteristics.

During the sampling period Sampling, the light emission signal EM of a turn-off level voltage is applied to the second transistor T2 and the fifth transistor T5. A first scan signal Scan1 of a turn-on level voltage is applied to the third transistor T3. A second scan signal Scan2 of a turn-on level voltage is applied to the first transistor T1. A third scan signal Scan3 of a turn-off level voltage is applied to the fourth transistor T4 and the sixth transistor T6.

When the sampling period Sampling is entered, the initialization voltage Vini L of the low-level voltage is applied to the third node N3 of the driving transistor D-TFT. If the third transistor T3 is turned on, the third node N3 and the second node N2 of the driving transistor D-TFT are electrically connected, and a turn-on level voltage is applied to the second node N2 of the driving transistor D-TFT.

If the driving transistor D-TFT, the first transistor T1, and the third transistor T3 are turned on during the sampling period Sampling, a voltage corresponding to the data voltage Vdata is applied to the second node N2 of the driving transistor D-TFT. Accordingly, a voltage corresponding to the data voltage Vdata is applied to one end of the storage capacitor Cstg.

Figure 4:
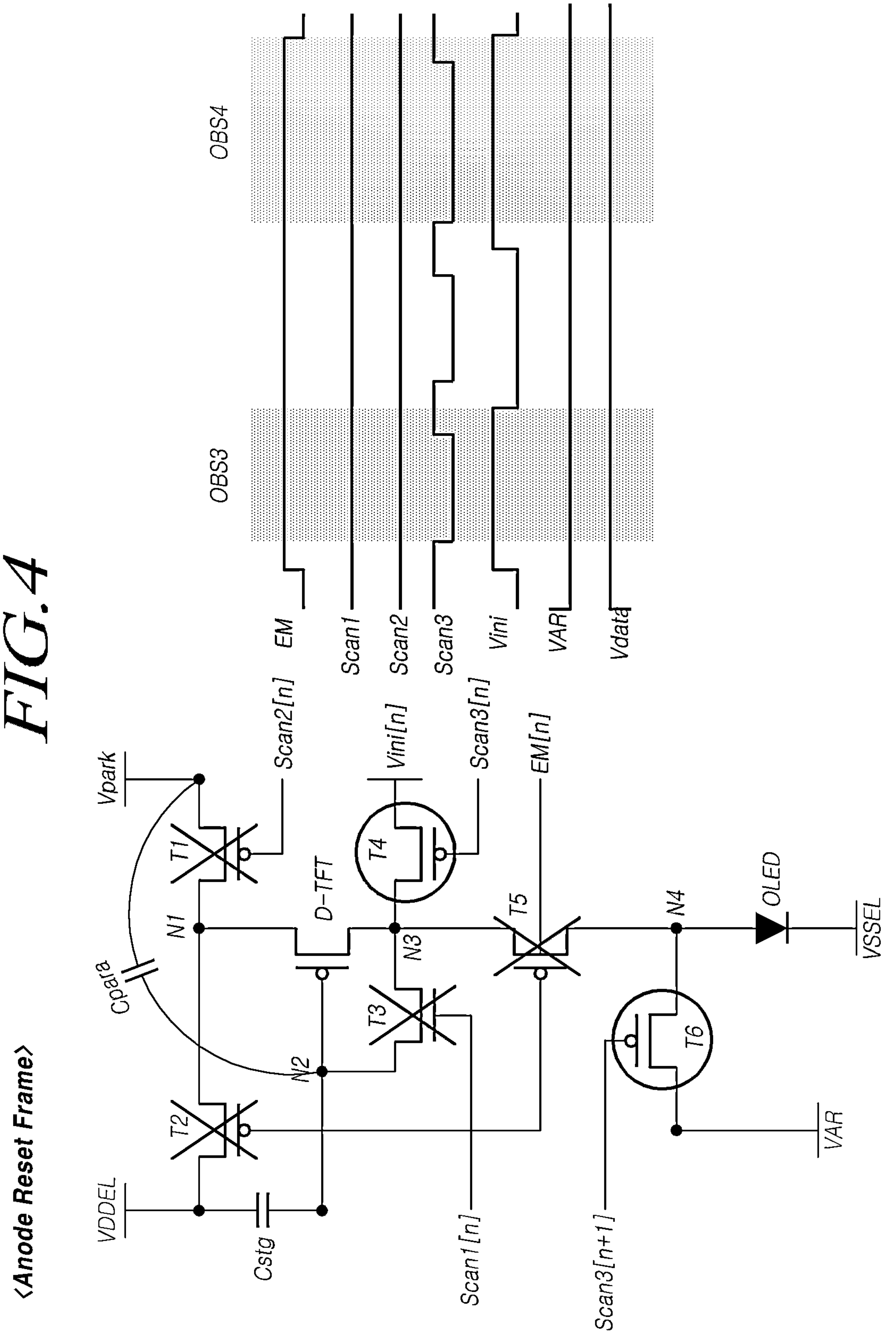
FIG. 4 is a view illustrating an anode reset frame in a display device according to embodiments of the disclosure.

FIG. 4 is a view illustrating an anode reset frame in a display device according to embodiments of the disclosure.

Referring to FIG. 4, the light emission signal EM of a turn-off level voltage is applied to the second transistor T2 and the fifth transistor T5. A first scan signal Scan1 of a turn-off level voltage is applied to the third transistor T3. A second scan signal Scan2 of a turn-off level voltage is applied to the first transistor T1. A third scan signal Scan3 is applied to the fourth transistor T4 and the sixth transistor T6. As the third scan signal Scan3, the turn-on level voltage and the turn-off level voltage may alternate during the anode reset frame period.

When the third scan signal Scan3 is a signal of a turn-on level voltage, the fourth transistor T4 is turned on. An initialization voltage Vini_H of a high level voltage is applied to the third node N3 of the driving transistor D-TFT.

During the anode reset frame period, the initialization voltage Vini_H of the high-level voltage may be applied to the third node N3 of the driving transistor D-TFT, and the corresponding period may be the third on-bias period OBS3 and the fourth on-bias period OBS4.

When the third scan signal Scan3 is a signal of a turn-on level voltage, the sixth transistor T6 is turned on. The preset anode reset voltage VAR is applied to the first electrode of the organic light emitting element OLED.

The voltage level of the anode reset voltage VAR applied to the first electrode of the organic light emitting element OLED during the anode reset frame period may be different from the voltage level of the anode reset voltage VAR applied to the first electrode of the organic light emitting element OLED during the refresh frame period. When the voltage levels of the voltages applied to the first electrode of the organic light emitting element OLED during the two periods differ from each other, to distinguish the two voltages, the anode reset voltage VAR during the refresh frame period is denoted by the VAR_A voltage, and the anode reset voltage VAR during the anode reset frame period is denoted by the VAR_B voltage.

Referring to FIG. 4, a data voltage Vdata having a preset voltage level is applied to the data line during the anode reset frame period.

A parasitic capacitance Cpara may be formed between the second node N2 of the driving transistor D-TFT and the data line DL applying the data voltage Vdata to the corresponding driving transistor D-TFT. In some cases, a physical capacitor device having one end electrically connected to the corresponding data line DL and the other end electrically connected to the second node N2 of the driving transistor D-TFT may be disposed. Described below is an example in which the parasitic capacitance Cpara is formed between the second node N2 of the driving transistor D-TFT and the data line DL.

As the parasitic capacitance Cpara is formed between the data line DL and the second node N2 of the driving transistor D-TFT during the anode reset frame period, it is possible to prevent a variation in the voltage level of the second node N2 of the driving transistor D-TFT by applying a preset level of voltage to the data line DL.

The data signal applied to the data line DL to prevent a variation in the voltage level of the second node N2 of the driving transistor D-TFT during the anode reset frame period is referred to as a park voltage Vpark. The voltage level of the park voltage Vpark may be the same as or similar to the voltage level of the data signal Vdata for displaying a black grayscale image or a low grayscale image.

As the variation in the voltage of the second node N2 of the driving transistor D-TFT during the anode reset frame period is minimized, the voltage level of the second node N2 of the driving transistor D-TFT may be substantially equal to or similar to the level of the voltage input during the sampling period Sampling of the previous refresh frame.

Figure 5:
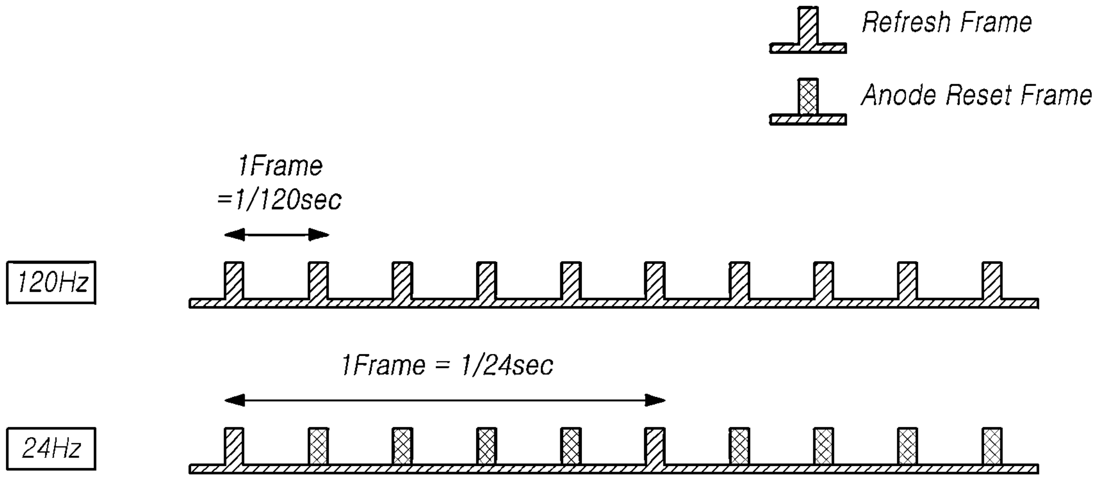
FIG. 5 is a view exemplarily illustrating high-speed driving and low-speed driving in a display device according to embodiments of the disclosure.

FIG. 5 is a view exemplarily illustrating high-speed driving and low-speed driving in a display device according to embodiments of the disclosure.

Referring to FIG. 5, the display device according to embodiments of the disclosure may perform high-speed driving in which all frames are refresh frames. The display device according to embodiments of the disclosure may perform low-speed driving in which at least one anode reset frame exists between different refresh frames. The low-speed driving is also referred to as low-scan rate driving.

For example, when the display device according to embodiments of the disclosure is driven at a scan rate of 120 Hz during high-speed driving, all 120 frames displayed for one second are refresh frames.

When the display device is driven at a refresh rate of 24 Hz, 24 frames out of 120 frames displayed for one second are refresh frames, and the remaining 96 frames are anode reset frames. In other words, after one refresh frame, four anode reset frames may follow.

Thus, the display device according to the embodiments of the disclosure may perform both high-speed driving and low-speed driving.

Figure 6:
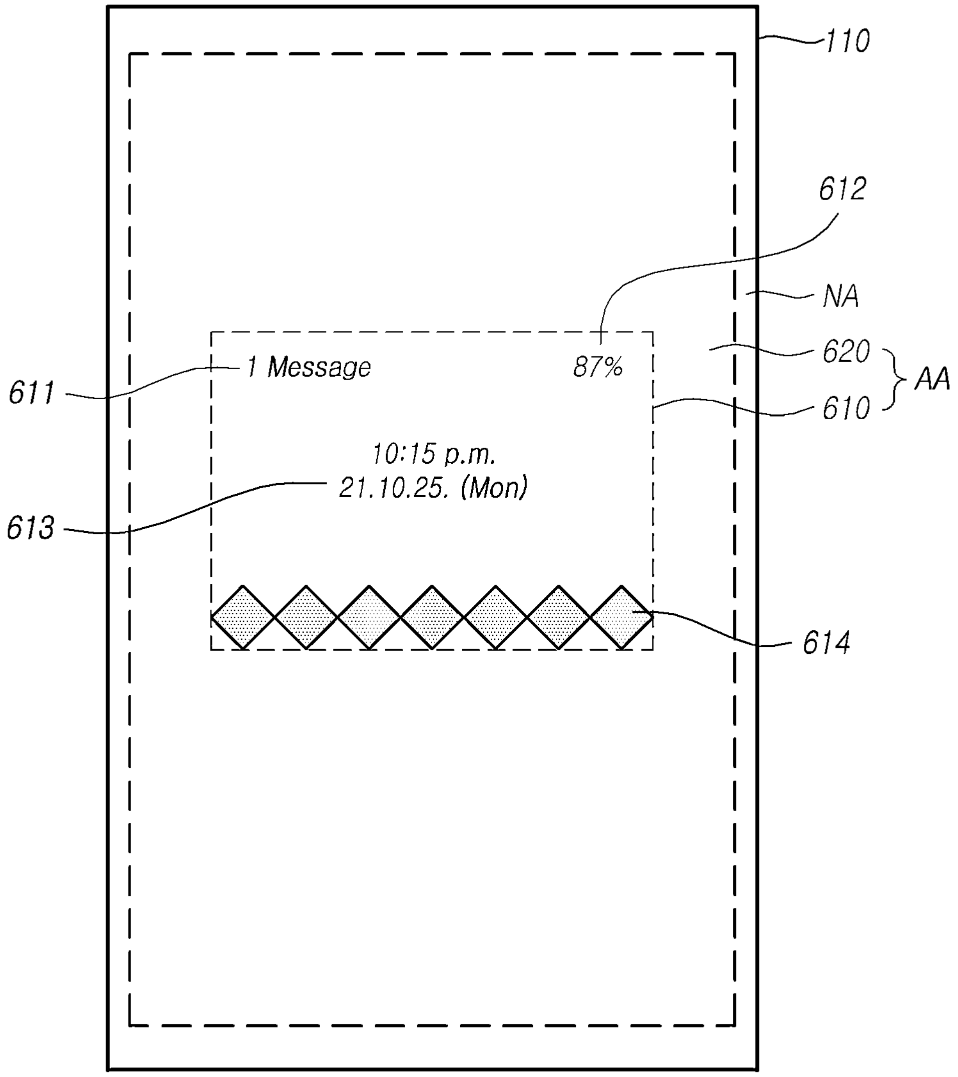
FIG. 6 is a view illustrating an always-on display (AoD) in a display device according to embodiments of the disclosure.

FIG. 6 is a view illustrating an always-on display (AoD) in a display device according to embodiments of the disclosure.

The always-on display refers (AoD) to displaying notification information 611, remaining battery level information 612, date and time information 613, or a decorative image 614, such as a screen saver, on the display panel 110 by the display device 100 during the standby screen period. The always-on display (AoD) is also referred to as ambient display.

The above-described notification information 611, remaining battery level information 612, date and time information 613, and decorative image 614, such as a screen saver, are displayed only in the always-on display area within the display area AA during the standby screen period.

During the standby screen period, a data voltage for displaying a black grayscale or low grayscale image is continuously applied to the black grayscale area 620 of the display area AA except for the always-on display area 610.

Such an always-on display (AoD) has the advantage of being able to identify various pieces of information during the idle screen period without activating the display device.

In particular, as compared to the display device requiring a backlight, the organic light emitting display device capable of turning off the light of the organic light emitting elements OLED consumes relatively low power even when the always-on display (AoD) is applied.

The display device 100 adopting the organic light emitting display may have burn-in as the organic light emitting elements OLED emit light for a long period of time. To prevent deterioration of the display quality due to burn-in, the size and/or position of the always-on display area 610 may vary over time during the standby screen period.

The always-on display area 610 may shrink and then enlarge over time. The position of the always-on display area 610 may move up, down, left, and right within the display area AA.

However, even when the always-on display (AoD) is applied, all data driving circuits should be used to display the black grayscale in the black grayscale area 620. Accordingly, the power consumption of the data driving circuit is still high, so that an enhancement is required.

Figure 7:
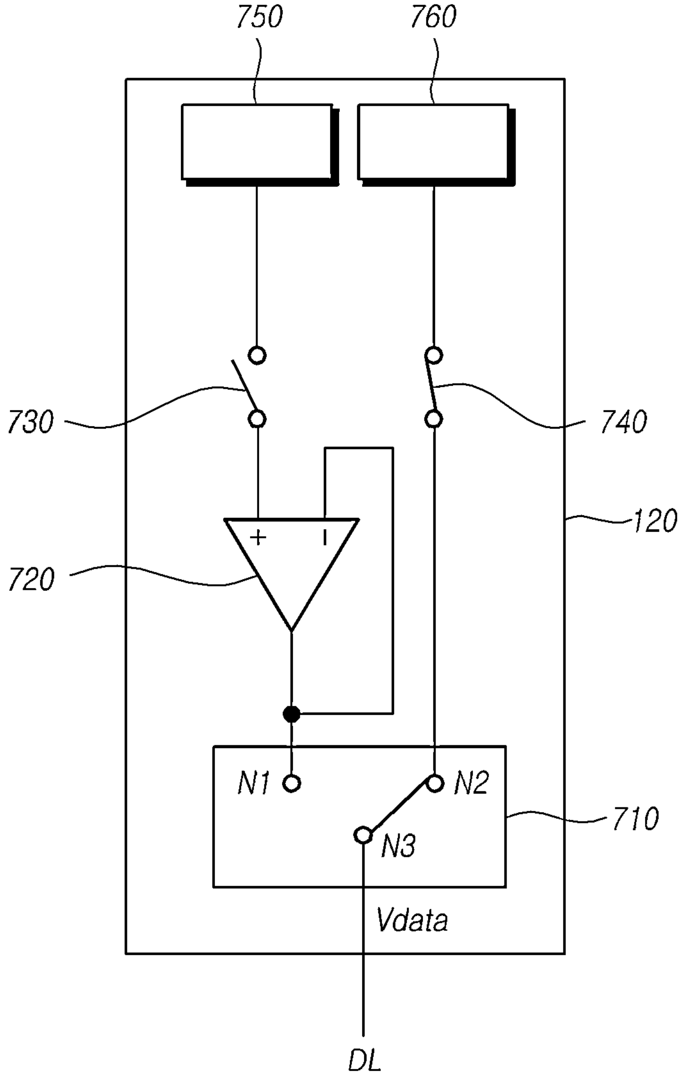
FIG. 7 is a view schematically illustrating a data driving circuit according to embodiments of the disclosure.

FIG. 7 is a view schematically illustrating a configuration of a data driving circuit 120 according to embodiments of the disclosure.

Referring to FIG. 7, the data driving circuit 120 according to embodiments of the disclosure may include an image display voltage output circuit 750, a voltage stabilization circuit 760, and a multiplexer 710.

The image display voltage output circuit 750 is a circuit configured to output the data voltage for image display or for displaying information.

The image display voltage output circuit 750 may include a shift register, a data register, a level shifter, and a digital-to-analog converter DAC.

The image display voltage output circuit 750 may receive various data driving timing control signals including a source start pulse SSP and a source sampling clock SSC and the image data DATA and output the data signal for image display.

The voltage stabilization circuit 760 may be a circuit configured to output a signal of a preset level voltage.

The voltage stabilization circuit 760 may be a circuit configured to output the data voltage Vdata input to the plurality of data lines DL during an anode reset frame period. In the same sense, the voltage stabilization circuit 760 may be a circuit configured to output the park voltage Vpark to the data line DL.

The voltage stabilization circuit 760 may be configured as a separate circuit different from the image display voltage output circuit 750. Even if the image display voltage output circuit 750 does not operate, the voltage stabilization circuit 760 alone may operate to output the data voltage Vdata of a preset level voltage to the data line DL. The voltage stabilization circuit 760 may be configured to output a constant voltage input to at least a partial area of the black grayscale area 620 during the standby screen period. In the black grayscale area 620, the constant voltage output from the voltage stabilization circuit 760 may be applied to subpixels positioned in at least the partial area, and a voltage output from the image display voltage output circuit 750 may be applied to subpixels positioned in a remaining partial area except for at least the partial area.

The multiplexer 710 is configured to output any one of the signal input from the image display voltage output circuit 750 and the signal input from the voltage stabilization circuit 760 to the data line DL.

The multiplexer 710 may include a first node N1 electrically connected to the image display voltage output circuit 750, a second node N2 electrically connected to the voltage stabilization circuit 760, and a third node N3 electrically connected to one data line DL. The multiplexer 710 may switch a node electrically connected with the third node N3 during the standby screen period.

While the first node N1 and the third node N3 of the multiplexer 710 are electrically connected, the voltage input from the image display voltage output circuit 750 may be output to the corresponding data line DL.

While the second node N2 and the third node N3 of the multiplexer 710 are electrically connected, the voltage input from the voltage stabilization circuit 760 may be output to the corresponding data line DL.

The signal output from the image display voltage output circuit 750 may be input to the first node N1 of the multiplexer 710 through the operational amplifier 720. The multiplexer 710 may electrically connect the second node N2 and the third node N3 during a low-scan rate driving period of the display device.

Referring to FIG. 7, the data driving circuit 120 may further include a first switch 730 configured to switch an electrical connection between the image display voltage output circuit 750 and the operational amplifier 720.

The data driving circuit 120 may further include a second switch 740 configured to switch an electrical connection between the voltage stabilization circuit 760 and the second node N2 of the multiplexer 710.

The first switch 730 may be turned on during a period when the first node N1 and the third node N3 of the multiplexer 710 are electrically connected.

The second switch 740 may be turned on during a period when the second node N2 and the third node N3 of the multiplexer 710 are electrically connected.

In the anode reset frame period, the second node N2 and the third node N3 of the multiplexer 710 are electrically connected.

During the standby screen period, the data voltage Vdata output from the voltage stabilization circuit 760 is applied to the data line DL supplying the data voltage Vdata only to the subpixels SP of the black grayscale area 620 except for the always-on display area. The third node N3 of the multiplexer 710 electrically connected to the corresponding data line DL is electrically connected to the second node N2.

Accordingly, it is possible to display the always-on display (AoD) screen while minimizing the driving of the image display voltage output circuit 750.

Figure 8:
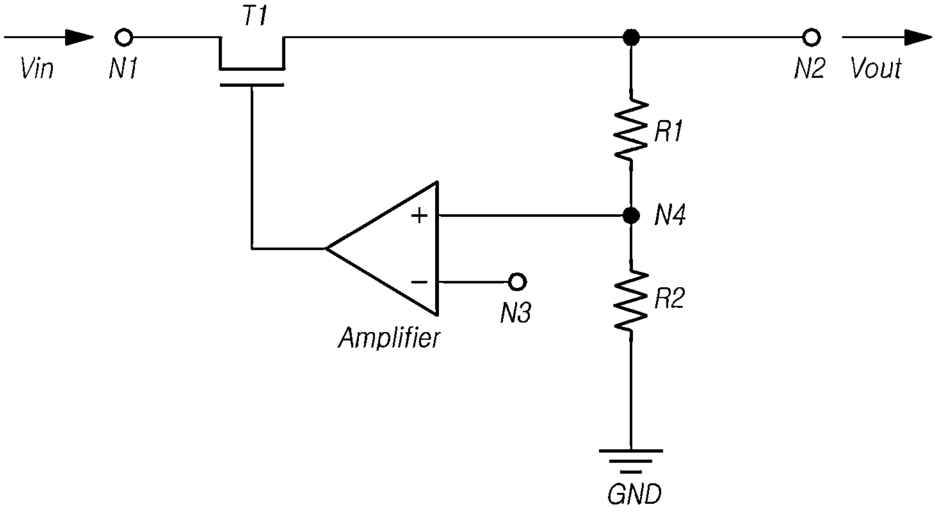
FIG. 8 is a view illustrating an example of a voltage stabilization circuit according to embodiments of the disclosure.

FIG. 8 is a view illustrating an example of a voltage stabilization circuit 760 according to embodiments of the disclosure.

Referring to FIG. 8, the voltage stabilization circuit 760 according to embodiments of the disclosure may include a first node N1 and a second node N2 and a first transistor T1 electrically connected to each of the first node N1 and the second node N2.

The first node N1 may be a node where a voltage is input from the outside. The second node N2 may be a node where a voltage is output from the voltage stabilization circuit 760. The first node N1 may be a source node or a drain node of the first transistor T1. The second node N2 may be a drain node or a source node of the first transistor T1.

The first transistor T1 may be a stabilization transistor configured to output a voltage of a preset constant level through the second node N2 even when the voltage of the first node N1 is changed.

The gate node of the first transistor T1 is electrically connected to an output terminal of an amplifier.

The amplifier may include a first input terminal electrically connected to the second node N2 and a second input terminal electrically connected to a third node N3 to which a reference voltage Vref is input. The amplifier includes an output terminal electrically connected to the gate node of the first transistor T1.

The first input terminal may be a non-inverting input terminal, and the second input terminal may be an inverting input terminal.

The first input terminal of the amplifier and the second node N2, respectively, are electrically connected to two opposite ends of a first resistor R1.

The first input terminal of the amplifier and a ground GND, respectively, are electrically connected to two opposite ends of a second resistor R2.

The voltage stabilization circuit 760 is also referred to as a low dropout (LDO) circuit.

Referring to FIG. 8, when the magnitude of the voltage Vin input to the first node N1 increases, the magnitude of the voltage input to the second node N2 increases. The magnitude of the voltage output from the output terminal of the amplifier increases so that the magnitude of the voltage applied to the gate node of the first transistor T1 increases.

As the magnitude of the voltage applied to the gate node of the first transistor T1 increases, the magnitude of the current flowing through the first transistor T1 increases. As the magnitude of the current of the first transistor T1 increases, the level of the voltage finally applied to the second node N2 is decreased.

Accordingly, a voltage having a constant level may be output to the second node N2.

As described above, the level of the voltage output from the second node N2 of the voltage stabilization circuit 760 may be identical or similar to the voltage level of the data signal for displaying the black grayscale or low grayscale image.

Figure 9:
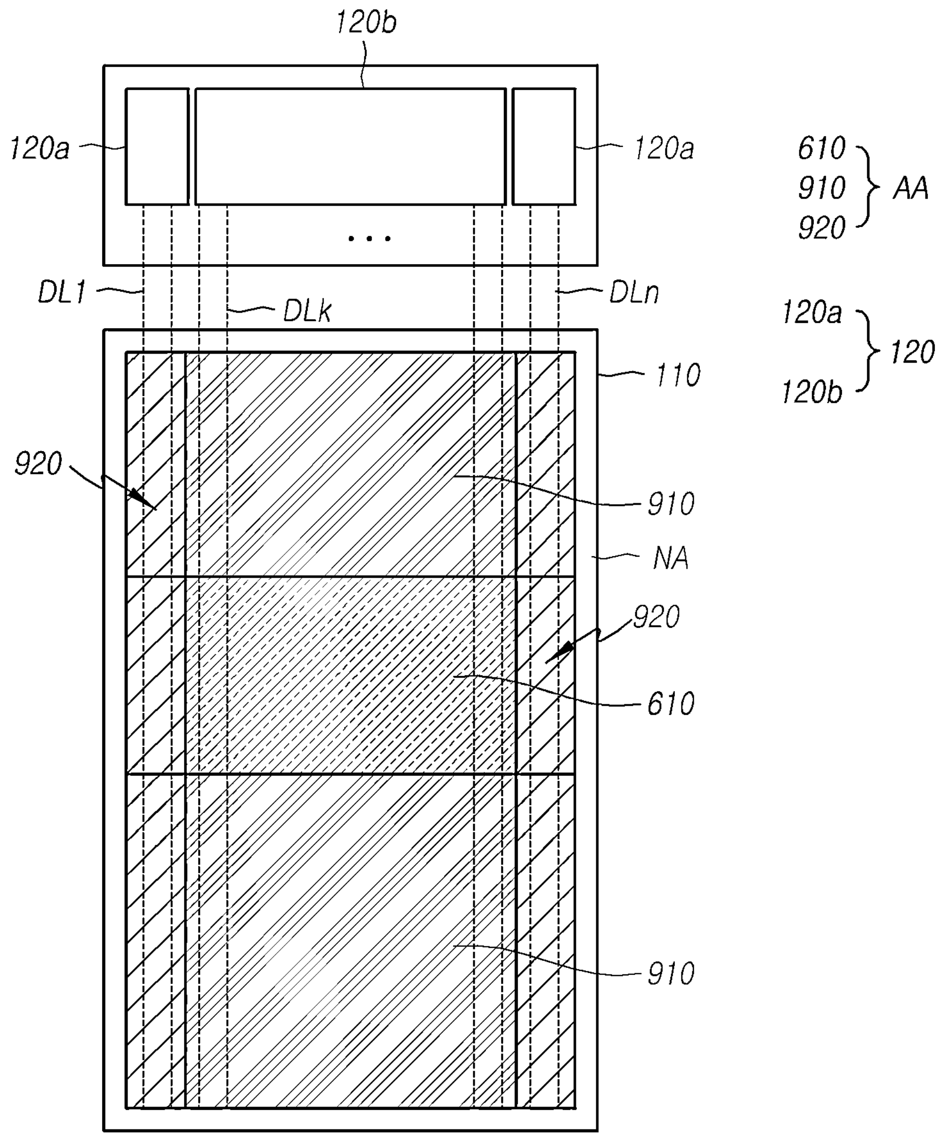
FIG. 9 is a view exemplarily illustrating an always-on display area and a black grayscale area in a display device according to embodiments of the disclosure.

FIG. 9 is a view exemplarily illustrating an always-on display area 610 and a black grayscale area 620 in a display device according to embodiments of the disclosure.

The black grayscale area 620 may include a first black grayscale area 910 and a second black grayscale area 920.

The first black grayscale area 910 is an area where the subpixels SP sharing the data line DL with the subpixels SP disposed in the always-on display area 610 are positioned.

The second black grayscale area 920 is an area where the subpixels SP not sharing the data line DL with the subpixels SP disposed in the always-on display area 610 are positioned.

In the display device according to embodiments of the disclosure, the voltage input from the above-described image display voltage output circuit 750 may be applied to the data line DL electrically connected to the subpixels SP positioned in the first black grayscale area 910, during the standby screen period.

In the display device according to embodiments of the disclosure, the voltage input from the image display voltage output circuit 750 and the voltage input from the voltage stabilization circuit 760 may be alternately applied to the data line DL electrically connected to the subpixels SP positioned in the first black grayscale area 910, during the standby screen period.

In the display device according to embodiments of the disclosure, the voltage input from the voltage stabilization circuit 760 may be applied to the data line DL electrically connected to the subpixels SP positioned in the second black grayscale area 920, during the standby screen period.

For example, during the standby screen period, the voltage input from the voltage stabilization circuit 760 may be applied to the first data line DL1 and the nth data line DLn positioned at two opposite ends of the display panel 110. The voltage input from the image display voltage output circuit 750 may be applied to the kth data line DLk ($1<k<n$) supplying the data signal Vdata to the subpixels SP positioned in the always-on display area 610. During the standby screen period, a data line positioned at a left end and a data line positioned at a right end among the plurality of data lines may be electrically connected to the voltage stabilization circuit 760.

The data driving circuit 120 according to embodiments of the disclosure may include a data driving circuit of a second area 120*b* for supplying the data voltage Vdata to the subpixels SP positioned in the always-on display area 610 and a data driving circuit of a first area 120*a* for supplying the data voltage Vdata to the second black grayscale area 920.

During the standby screen period, the data driving circuit of the first area 120*a* may output the data voltage Vdata input from the voltage stabilization circuit 760 to the data line DL. In the meantime, the image display voltage output circuit 750 positioned in the first area 120*a* may not be driven.

During the standby screen period, the data driving circuit of the second area 120*b* may output the data voltage Vdata input from the image display voltage output circuit 750 to the data line DL.

The display device 100 according to embodiments of the disclosure may display an image in the always-on display area 610 by driving the image display voltage output circuit 750 to a minimum during the standby screen period. During an image display period different from the standby screen period, the data driving circuit 120 may input a data voltage for image display to the plurality of data lines in a refresh frame and input a data voltage output from the voltage stabilization circuit 760 to the plurality of data lines in an anode reset frame other than the refresh frame.

In the display device 100 according to embodiments of the disclosure, when the size and/or position of the always-on display area 610 changes over time, a circuit applying a data voltage to at least one data line among the plurality of data lines may be switched. For example, the first area 120*a* and second area 120*b* of the data driving circuit 120 may be varied.

Figure 10:
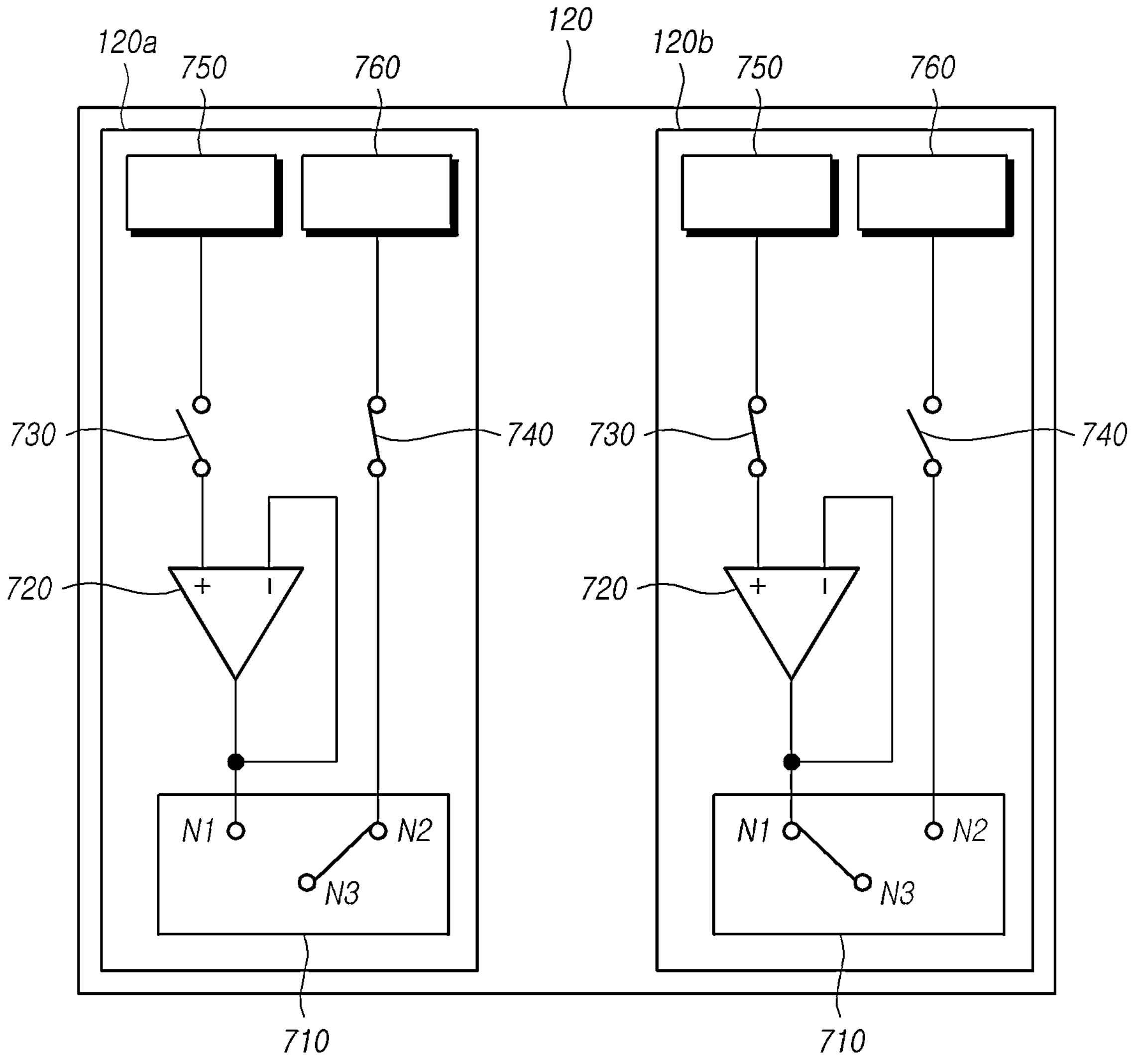
FIG. 10 is a view exemplarily illustrating a data driving circuit having both a first area in which a voltage input from a voltage stabilization circuit is output and a second area in which a voltage input from an image display voltage output circuit is output, during a standby screen period.

FIG. 10 is a view exemplarily illustrating a data driving circuit 120 divided into both a first area 120*a* in which a voltage input from a voltage stabilization circuit 760 is output and a second area 120*b* in which a voltage input from an image display voltage output circuit 750 is output, during a standby screen period.

Referring to FIG. 10, the data driving circuit 120 according to embodiments of the disclosure may be divided into both a first area 120*a* for outputting the voltage input from the voltage stabilization circuit 760 and a second area 120*b* for outputting the voltage input from the image display voltage output circuit 750, during the standby screen period. During the standby screen period, the multiplexer 710 positioned in the first area 120*a* may electrically connect the second node N2 and the third node N3, and the multiplexer 710 positioned in the second area 120*b* may electrically connect the first node N1 and the third node N3.

Accordingly, the data driving circuit 120 may display an always-on display (AoD) image in a partial area without driving the image display voltage output circuit 750, so that the power efficiency of the data driving circuit 120 may be significantly enhanced.

The foregoing embodiments of the disclosure are briefly described below.

Embodiments of the disclosure may provide a display device 100 comprising a display panel 110 divided into an always-on display area 610 displaying information during a standby screen period and a black grayscale area 620 except for the always-on display area 610, an image display voltage output circuit 750 outputting a data voltage Vdata to input to the always-on display area 610 during the standby screen period, and a voltage stabilization circuit 760 outputting a constant voltage Vpark to input to at least a partial area of the black grayscale area 620 during the standby screen period.

Embodiments of the disclosure may provide the display device 100, wherein the display panel 110 includes a plurality of subpixels SP and a plurality of data lines DL configured to apply a data voltage Vdata to the plurality of subpixels SP, and wherein the display device 100 further comprises a data driving circuit outputting the data voltage Vdata to the plurality of data lines DL and including the image display voltage output circuit 750 and the voltage stabilization circuit 760.

Embodiments of the disclosure may provide the display device 100, wherein the display panel 110 includes a plurality of subpixels SP and a plurality of data lines DL inputting a data voltage Vdata to the plurality of subpixels SP, wherein during an image display period different from the standby screen period, the data driving circuit inputs a data voltage Vdata for image display to the plurality of data lines DL in a refresh frame and inputs a data voltage Vdata output from the voltage stabilization circuit 760 to the plurality of data lines DL in an anode reset frame other than the refresh frame.

Embodiments of the disclosure may provide the display device 100, wherein the display panel 110 includes a plurality of subpixels SP including a light emitting element, and wherein a preset anode reset voltage is applied to an anode electrode of the light emitting element in the anode reset frame.

Embodiments of the disclosure may provide the display device 100, wherein the data driving circuit includes a multiplexer 710, and wherein the multiplexer 710 includes a first node N1 electrically connected with the image display voltage output circuit 750, a a second node N2 electrically connected with the voltage stabilization circuit 760, and a third node N3 electrically connected with one data line DL among the plurality of data lines DL.

Embodiments of the disclosure may provide the display device 100, wherein the data driving circuit is divided into a first area 120*a* and a second area 120*b*, and wherein during the standby screen period, the multiplexer 710 positioned in the first area 120*a* electrically connects the second node N2 and the third node N3 and the multiplexer 710 positioned in the second area 120*b* electrically connects the first node N1 and the third node N3.

Embodiments of the disclosure may provide the display device 100, wherein during the standby screen period, a data line DL1 positioned at a left end and a data line DLn positioned at a right end among the plurality of data lines DL are electrically connected to the voltage stabilization circuit 760.

Embodiments of the disclosure may provide the display device 100, wherein in the black grayscale area 620, the constant voltage Vpark output from the voltage stabilization circuit 760 is applied to subpixels SP positioned in at least the partial area 920, and a voltage output from the image display voltage output circuit 750 is applied to subpixels SP positioned in a remaining partial area 910 except for at least the partial area.

Embodiments of the disclosure may provide the display device 100, wherein during the standby screen period, a size or position of the always-on display area 610 is varied over time, and wherein as the size or position of the always-on display area 610 is varied, a circuit 750 or 760 applying a data voltage Vdata to at least one data line DL among the plurality of data lines DL is switched.

Embodiments of the disclosure may provide a data driving circuit 120 comprising an image display voltage output circuit 750 outputting a data voltage Vdata for displaying information during a standby screen period, a voltage stabilization circuit 760 configured to output a preset level of data voltage Vdata during the standby screen period, and a multiplexer 710 configured to output any one of a voltage input from the image display voltage output circuit 750 and a voltage input from the voltage stabilization circuit 760.

Embodiments of the disclosure may provide the data driving circuit 120, wherein the multiplexer 710 includes a first node N1 electrically connected with the image display voltage output circuit 750, a second node N2 electrically connected with the voltage stabilization circuit 760, and a third node N3 electrically connected with a data line DL to which the data voltage Vdata is applied.

Embodiments of the disclosure may provide the data driving circuit 120, wherein the data driving circuit is divided into a first area 120*a* and a second area 120*b*, and wherein during the standby screen period, the multiplexer 710 positioned in the first area 120*a* electrically connects the second node N2 and the third node N3 and the multiplexer 710 positioned in the second area 120*b* electrically connects the first node N1 and the third node N3.

Embodiments of the disclosure may provide the data driving circuit 120, wherein the multiplexer 710 switches a node electrically connected with the third node N3 during the standby screen period.

Embodiments of the disclosure may provide the data driving circuit 120, wherein the multiplexer 710 electrically connects the second node N2 and the third node N3 during a low-scan rate driving period of a display device 100 including the data driving circuit.

Embodiments of the disclosure may provide the data driving circuit 120, wherein during the standby screen period, the data driving circuit is divided into both a first area 120*a* where a voltage input from the voltage stabilization circuit 760 is output and a second area 120*b* where a voltage input from the image display voltage output circuit 750 is output.

It will be apparent to those skilled in the art that various modifications and variations can be made in the display device and the data driving circuit of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:

a display panel including a plurality of subpixels and a plurality of data lines connected to the plurality of subpixels, and divided into an always-on display area displaying information during a standby screen period and a black grayscale area except for the always-on display area;

an image display voltage output circuit configured to output a data voltage to input to the always-on display area during the standby screen period;

a voltage stabilization circuit configured to output a constant voltage to input to at least a partial area of the black grayscale area during the standby screen period; and a data driving circuit configured to output the data voltage to the plurality of data lines and including the image display voltage output circuit and the voltage stabilization circuit, wherein the constant voltage is a data voltage to input to at least one of the data lines connected to one or more of the subpixels in at least the partial area of the black grayscale area, and wherein during an image display period different from the standby screen period, the data driving circuit inputs a data voltage for image display to the plurality of data lines in a refresh frame and inputs a data voltage output from the voltage stabilization circuit to the plurality of data lines in an anode reset frame other than the refresh frame.

2. The display device of claim 1, wherein the display panel includes a plurality of subpixels including a light emitting element, and wherein a preset anode reset voltage is applied to an anode electrode of the light emitting element in the anode reset frame.

3. The display device of claim 1, wherein the data driving circuit includes a multiplexer, and wherein the multiplexer includes:

a first node electrically connected with the image display voltage output circuit;

a second node electrically connected with the voltage stabilization circuit; and a third node electrically connected with one data line among the plurality of data lines.

4. The display device of claim 3, wherein the data driving circuit is divided into a first area and a second area, and wherein during the standby screen period, the multiplexer positioned in the first area electrically connects the second node and the third node, and the multiplexer positioned in the second area electrically connects the first node and the third node.

5. The display device of claim 1, wherein during the standby screen period, a data line positioned at a left end and a data line positioned at a right end among the plurality of data lines are electrically connected to the voltage stabilization circuit.

6. The display device of claim 1, wherein in the black grayscale area, the constant voltage output from the voltage stabilization circuit is applied to subpixels positioned in at least the partial area, and a voltage output from the image display voltage output circuit is applied to subpixels positioned in a remaining partial area except for at least the partial area.

7. The display device of claim 1, wherein during the standby screen period, a size or position of the always-on display area is varied over time, and wherein as the size or position of the always-on display area is varied, a circuit applying a data voltage to at least one data line among the plurality of data lines is switched.

8. The display device of claim 1, wherein the black grayscale area includes:

a first black grayscale area in which the subpixels sharing a corresponding data line with the subpixels disposed in the always-on display area are positioned; and a second black grayscale area in which the subpixels not sharing a corresponding data line with the subpixels disposed in the always-on display area are positioned.

9. The display device of claim 1, wherein the voltage stabilization circuit includes:

a first node through which a voltage is input from the outside;

a second node through which the constant voltage is outputted; and a first transistor electrically connected to each of the first node and the second node, wherein a gate node of the first transistor is electrically connected to an output terminal of an amplifier, and the amplifier includes a first input terminal electrically connected to the second node and a second input terminal electrically connected to a third node.

10. The display device of claim 9, wherein a reference voltage is input to the third node, the first input terminal is a non-inverting input terminal, and the second input terminal is an inverting input terminal.

11. The display device of claim 9, wherein the voltage stabilization circuit further includes a first resistor and a second resistor, wherein the first input terminal of the amplifier and the second node, respectively, are electrically connected to two opposite ends of the first resistor, and the first input terminal of the amplifier and a ground, respectively, are electrically connected to two opposite ends of the second resistor.

12. A data driving circuit, comprising:

an image display voltage output circuit outputting a data voltage for displaying information during a standby screen period;

a voltage stabilization circuit configured to output a preset level of data voltage during the standby screen period; and a multiplexer configured to output any one of a voltage input from the image display voltage output circuit and a voltage input from the voltage stabilization circuit, wherein the multiplexer includes:

a first node electrically connected with the image display voltage output circuit;

a second node electrically connected with the voltage stabilization circuit; and a third node electrically connected with a data line to which the data voltage is applied.

13. The data driving circuit of claim 12, wherein the data driving circuit is divided into a first area and a second area, and wherein during the standby screen period, the multiplexer positioned in the first area electrically connects the second node and the third node, and the multiplexer positioned in the second area electrically connects the first node and the third node.

14. The data driving circuit of claim 12, wherein the multiplexer switches a node electrically connected with the third node during the standby screen period.

15. The data driving circuit of claim 12, wherein the multiplexer electrically connects the second node and the third node during a low-scan rate driving period of a display device including the data driving circuit.

16. The data driving circuit of claim 12, wherein during the standby screen period, the data driving circuit is divided into both a first area where a voltage input from the voltage stabilization circuit is output and a second area where a voltage input from the image display voltage output circuit is output.

17. The data driving circuit of claim 12, wherein the voltage stabilization circuit includes:

a first node through which a voltage is input from the outside;

a second node through which the preset level of data voltage is outputted; and a first transistor electrically connected to each of the first node and the second node, wherein a gate node of the first transistor is electrically connected to an output terminal of an amplifier, and the amplifier includes a first input terminal electrically connected to the second node and a second input terminal electrically connected to a third node.

18. The data driving circuit of claim 17, wherein a reference voltage is input to the third node, the first input terminal is a non-inverting input terminal, and the second input terminal is an inverting input terminal.

19. The data driving circuit of claim 17, wherein the voltage stabilization circuit further includes a first resistor and a second resistor, wherein the first input terminal of the amplifier and the second node, respectively, are electrically connected to two opposite ends of the first resistor, and the first input terminal of the amplifier and a ground, respectively, are electrically connected to two opposite ends of the second resistor.

* * * * *